United States Patent
Sun et al.

(10) Patent No.: US 12,472,833 B2
(45) Date of Patent: Nov. 18, 2025

(54) ELECTRICAL TOPOLOGY OF INTEGRATED DC CHARGING STATION AND OPERATION CONTROL METHOD THEREOF

(71) Applicants: STATE GRID JIANGSU ELECTRIC POWER CO., LTD. RESEARCH INSTITUTE, Jiangsu (CN); JIANGSU ELECTRIC POWER RESEARCH INSTITUTE CO., LTD., Jiangsu (CN)

(72) Inventors: Tiankui Sun, Jiangsu (CN); Mingming Shi, Jiangsu (CN); Xiaolong Xiao, Jiangsu (CN); Jinggang Yang, Jiangsu (CN); Liguo Liu, Jiangsu (CN); Qifeng Huang, Jiangsu (CN); Shuyi Zhuang, Jiangsu (CN); Wei Su, Jiangsu (CN); Lei Gao, Jiangsu (CN); Yubo Yuan, Jiangsu (CN); Xiaodong Yuan, Jiangsu (CN); Jian Liu, Jiangsu (CN); Shu Chen, Jiangsu (CN)

(73) Assignees: STATE GRID JIANGSU ELECTRIC POWER CO., LTD. RESEARCH INSTITUTE (CN); JIANGSU ELECTRIC POWER RESEARCH INSTITUTE CO., LTD. (CN)

( * ) Notice: Subject to any disclaimer, the term of this patent is extended or adjusted under 35 U.S.C. 154(b) by 389 days.

(21) Appl. No.: 18/001,263

(22) PCT Filed: Jul. 2, 2021

(86) PCT No.: PCT/CN2021/104273
§ 371 (c)(1),
(2) Date: Dec. 9, 2022

(87) PCT Pub. No.: WO2022/142234
PCT Pub. Date: Jul. 7, 2022

(65) Prior Publication Data
US 2023/0322098 A1    Oct. 12, 2023

(30) Foreign Application Priority Data

Dec. 30, 2020 (CN) .......................... 202011618136.0

(51) Int. Cl.
*H02J 7/00* (2006.01)
*B60L 53/10* (2019.01)
*B60L 53/62* (2019.01)

(52) U.S. Cl.
CPC ............... *B60L 53/11* (2019.02); *B60L 53/62* (2019.02)

(58) Field of Classification Search
USPC ......................................................... 320/109
See application file for complete search history.

(56) References Cited

U.S. PATENT DOCUMENTS 10,093,193 B2 * 10/2018 Ohkuma ............... B60L 53/305
2013/0057210 A1 * 3/2013 Nergaard ................ B60L 53/11
320/109

(Continued)

*Primary Examiner* — Samuel Berhanu

(57) ABSTRACT

Disclosed is an electrical topology of an integrated DC charging station and an operation control method. The electrical topology comprises a supply side DC bus, K discrete charging pile units and a mutual aid total DC bus; each charging pile unit comprises an input DC bus, a mutual aid sub-DC bus, an output DC bus, N isolation branches, a non-isolation DC/DC module and an output terminal, the input DC bus is connected to the supply side DC bus, and the mutual aid sub-DC bus of each charging pile unit is connected to the mutual aid total DC bus; the isolation branch comprises an output branch and a mutual aid branch; and when all the output branches of one charging pile unit are started and the output power cannot meet the required power, the mutual aid branches of other charging pile units are started to meet the required power.

8 Claims, 1 Drawing Sheet

(56) References Cited

U.S. PATENT DOCUMENTS

2019/0193584 A1* 6/2019 Chen .................... H02J 7/34
2019/0372465 A1* 12/2019 Xu .................. H02M 3/33571
2020/0001730 A1* 1/2020 Gohla-Neudecker .....................
                                                            B60L 53/11

* cited by examiner

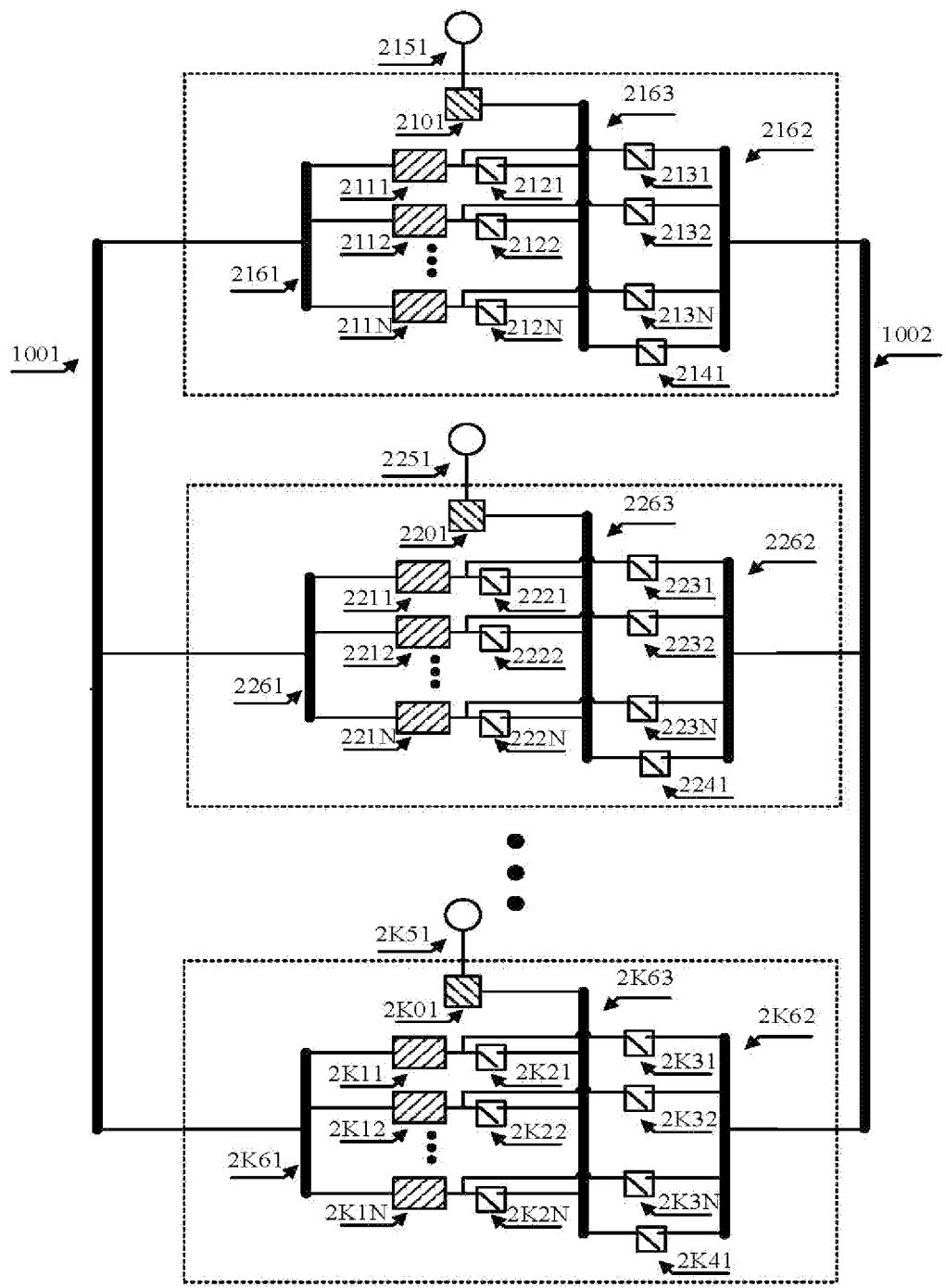

ELECTRICAL TOPOLOGY OF INTEGRATED DC CHARGING STATION AND OPERATION CONTROL METHOD THEREOF

FIELD OF THE INVENTION

The invention belongs to the technical field of electric vehicle charging, and particularly relates to a high-efficiency electrical topology of an integrated DC charging station and an operation control method thereof.

BACKGROUND OF THE INVENTION

An existing DC charging station for electric vehicles is mainly composed of a plurality of DC charging piles. In order to meet the charging safety requirements, a high-frequency electrical isolation method is preferably used in the DC charging pile for high-frequency isolation between a DC bus on a supply side and a DC, bus on a charging side.

At present, high-frequency DC isolation is realized by installing isolation DC/DC modules between the DC bus on the supply side and the DC bus on the charging side. There are mainly two types of electrical topologies. One is, that the isolation DC/DC modules are installed in the DC charging piles respectively, which saves the floor space of the DC charging station, but the isolation DC/DC modules cannot be shared by the charging piles, and the isolation capacity of the charging pile is fixed. The other way is that all the isolation DC/DC modules are installed together and connected to each charging pile by changeable electrical connection; and although the capacities of the isolation DC/DC modules can be shared by the charging piles, this installation method requires an independent station building to install the isolation DC/DC modules and wiring between the isolation modules and the charging piles is complicated.

Therefore, an electrical topology which not only allows the isolation DC/DC modules to be installed in the DC charging piles respectively to save the building area, but also allows the capacities of these isolation DC/DC modules to be shared by the DC charging piles is of, great value.

SUMMARY OF THE INVENTION

Purpose of the Invention: To allow the isolation capacity to be shared by DC charging piles in a DC charging station, the invention provides an electrical topology of an integrated DC charging station and an operation control method thereof.

Technical Scheme: An electrical topology of an integrated DC charging station comprises a supply side DC bus connected to a DC source, K discrete charging pile units and a mutual aid total DC bus;

each charging pile unit comprises an input DC bus, a mutual aid sub-DC bus, an output DC bus, N isolation branches, a non-isolation DC/DC module and, an output terminal, the input DC bus of each charging pile unit is connected to the supply side DC bus, and the mutual aid sub-DC bus of each charging pile unit is connected to the mutual aid total DC bus;

the isolation branches have a same configuration, comprising an isolation DC/DC module, an output switch and a mutual aid switch;

in each isolation branch, an input side of the isolation DC/DC module is connected to the input DC bus, an output side is connected to the output DC bus through the output switch to form an output branch, and the output side is connected to the mutual aid sub-DC bus through the mutual aid switch to form a mutual, aid branch; the mutual aid sub-DC bus is connected to the output DC bus through a switch, and the output DC bus is connected to the output terminal through the non-isolation DC/DC module; and when all the output branches of a charging pile unit connected to an electric vehicle are started and output power cannot meet required power of the electric vehicle, the mutual aid branches of other charging pile units are started to meet the required power of the electric vehicle.

Further, the DC source is a DC distribution network feeder or a DC side feeder of an AC/DC module of the charging station.

Further, a rated current $I_{11}$ of the supply side DC bus is greater than or equal to a rated current of the DC source.

Further, a rated current $I_{12}$ of the mutual aid total DC bus satisfies:

$I_{12} \geq I_{11}/U_{12}$, where $U_{11}$ is a rated voltage of the supply side DC bus and $U_{12}$ is a rated voltage of the mutual aid total DC bus.

Further, a rated current of each output switch and mutual aid switch is greater than or equal to a rated current $I_{32}$ of an output side of the isolation DC/DC module.

Further, the rated current $I_{32}$ of the output side of each isolation DC/DC module satisfies: $I_{32}=I_{21} \times U_{11}/(U_{12} \times N)$, where $I_{21}$ is a rated current of the input DC bus, $I_{21}=I_{11}/K$, $U_{11}$ is a rated voltage of the supply side DC bus, and $I_{11}$ is a rated current of the supply side DC bus; and the rated current $I_{23}$ of each output DC bus satisfies: $I_{23} \geq I_{32} \times N + I_{22}$; where $I_{22}$ is a rated current of the mutual aid sub-DC bus.

Further, a rated voltage $U_{42}$ and a rated current $I_{42}$ of an output side of each non-isolation DC/DC module satisfy: $U_{42} \times I_{42} \geq U_{12} \times I_{22} \times r$, where $U_{12}$ is a rated voltage of the mutual aid total DC bus, $I_{22}$ is a rated current of the mutual aid sub-DC bus, and r is a coincidence factor.

The invention further discloses an operation control method of the electrical topology of an integrated DC charging station described above, comprising:

when the integrated DC charging station runs normally, all output switches and mutual aid switches being off, and all isolation DC/DC modules and non-isolation DC/DC modules not working;

when a current charging pile unit is connected to, an electric vehicle, the following steps being performed:

step 1, assuming that the required power of the electric vehicle is $P_v$, determining whether $P_v$ is greater than $I_{32} \times N$;

if $P_v$ is greater than $I_{32} \times N$, determining whether the number d of isolation DC/DC modules in an idle state in other charging pile units satisfies:

$(P_v/U_{12} - I_{32} \times N) \leq d \times I_{32}$; if so, proceeding to step 2; if not, that is, $(P_v/U_{12} - I_{32} \times N) > d \times I_{32}$, proceeding to step 3;

if $P_v$ is less than or equal to $I_{32} \times N$, starting b isolation DC/DC modules in the current charging pile unit, closing an output switch connected to the b started isolation DC/DC modules, and starting the non-isolation DC/DC module of the current charging pile unit so that the current charging pile unit outputs the required power of the electric vehicle, where b satisfies: $(b-1) \times I_{32} < P_v/U_{12} \leq b \times I_{32}$;

step 2, starting N isolation DC/DC modules in the current charging pile unit, closing an output switch connected to the N started isolation DC/DC modules, and starting the non-isolation DC/DC module of the current charging pile unit; meanwhile, starting c isolation DC/DC modules in an idle state in other charging pile units, c satisfies: $(c-1) \times I_{32} < (P_v/U_{12} - I_{32} \times N) \leq c \times I_{32}$, and closing a mutual aid switch connected to the c started isolation DC/DC modules so that the current charging pile unit outputs the required power of the electric vehicle; and step 3, starting N isolation DC/DC modules in the current charging pile unit, closing an output switch connected to the isolation DC/DC modules, and starting the non-isolation DC/DC module of the current charging pile unit; meanwhile, starting d isolation DC/DC modules in an idle state in other charging pile units, and closing a mutual aid switch connected to the d isolation DC/DC modules so that the current charging pile unit outputs a power smaller than the required power of the electric vehicle.

Beneficial Effects: Compared with the prior art, the invention has the following beneficial effects:

(1) compared with a traditional discrete scheme that isolation DC/DC modules are respectively installed in different DC charging piles, the electrical topology of an integrated DC charging station provided by the invention allows isolation modules to be shared by charging piles, greatly reducing the capacity of the isolation module in each DC charging pile, and further reducing the cost;

(2) compared with a traditional centralized scheme that all isolation DC/DC modules are installed together, the electrical topology of, an integrated DC charging station provided by the invention can greatly reduce the building area of the charging station; and (3) the invention not only allows the isolation DC/DC modules to be installed in the DC charging piles respectively to save the building area, but also allows the capacities of these isolation DC/DC modules to be shared by the DC charging piles.

BRIEF DESCRIPTION OF DRAWINGS

FIG. 1 is a diagram of an electrical topology of an integrated DC charging pile of the invention.

DETAILED DESCRIPTION OF THE INVENTION

The technical scheme of the invention will be further explained with reference to the drawings and embodiments.

As shown in FIG. 1, an electrical topology of an integrated DC charging station of the invention is suitable for high-power fast DC charging stations, and comprises a supply side DC bus 1001, a mutual aid total DC bus 1002, and K discrete charging pile units. The supply side DC bus 1001 is connected to a DC source, which comprises, but is not limited to, a DC distribution network feeder or a DC side feeder of an AC/DC module of the charging station.

The charging pile units have a same configuration. The first charging pile unit comprises an input DC bus 2161, a mutual aid sub-DC bus 2162, an output DC bus 2163, N isolation DC/DC modules (2111-211N in FIG. 1), N output switches (2121-212N in FIG. 1), N mutual aid switches (2131-213N in FIG. 1), a non-isolation DC/DC module 2101, an output terminal 2151 and a switch 2141. Therefore, the second charging pile unit comprises an input DC bus 2261, a mutual aid sub-DC bus 2262, an output DC bus 2263, N isolation DC/DC modules (2211-221N in FIG. 1), N output switches (2221-222N in FIG. 1), N mutual aid switches (2231-223N in FIG. 1), a non-isolation DC/DC module 2201, an output terminal 2251 and a switch 2241. The $K^{th}$ charging pile unit comprises, an input DC bus 2K61, a mutual aid sub-DC bus 2K62, an output DC bus 2K63, N isolation DC/DC modules (2K11-2K1N in FIG. 1), N output switches (2K21-2K2N in FIG. 1), N mutual aid switches (2K31-2K3N in FIG. 1), a non-isolation DC/DC module 2K01, an output terminal 2K51 and a switch 2K41.

The input DC bus of each charging pile unit is connected to the supply side DC bus 1001, that is, the input DC bus 2161 of the first charging pile unit, the input DC bus 2261 of the second charging pile unit . . . the input DC bus 2K61 of the $K^{th}$ charging pile unit are all connected to the supply side DC bus 1001. The mutual aid sub-DC bus of each charging pile unit is connected to the mutual aid total DC bus 1002, that is, the mutual aid sub-DC bus 2162 of the first charging pile unit, the mutual aid sub-DC bus 2262 of the second charging pile unit . . . the mutual aid sub-DC bus 2K62 of the $K^{th}$ charging pile unit are all connected to the mutual aid total DC bus 1002.

An internal topology of the charging pile unit of the invention will be explained in detail by taking the first charging pile unit as an example. The input DC bus 2161 is connected to input sides of the N isolation DC/DC modules (2111-211N in FIG. 1), and output sides of the N isolation DC/DC modules (2111-211N in FIG. 1) are all connected to the output switches (2121-212N in FIG. 1) and the mutual aid switches (2131-213N in FIG. 1). The output DC bus 2163 is connected to all the output switches (2121-212N in FIG. 1) and the non-isolation DC/DC module 2101, which is connected to the output terminal 2151, and the mutual aid sub-DC bus 2162 is connected to the output DC bus 2163 through the switch 2141. For the convenience of understanding, take the first, isolation DC/DC module 2111 as an example. The input side of the isolation DC/DC module 2111 is connected to the input DC bus 2161, and the output side is connected to the output DC bus 2163 through the output switch 2121. The output DC bus 2163 is connected to the output terminal 2151 through the non-isolation DC/DC module 2101, and the output side of the isolation DC/DC module 2111 is connected to the mutual aid sub-DC bus 2162 through the mutual aid switch 2131. Based on this connection relationship, the connection of the N isolation DC/DC modules in the first charging pile unit is realized.

The capacity configuration principle of the electrical topology of an integrated DC charging station with the above structure is explained below.

The charging process of an electric vehicle using DC charging piles is mainly divided into three stages: constant-current charging, constant-voltage charging and trickle charging. The charging power gradually increases and then decreases, and the required power is much lower than the maximum power in most of the charging process.

Therefore, the rated working voltage and insulation and voltage resistance of all components in, the electrical topology of an integrated DC charging station of the invention should be greater than the requirements of relevant standards. Specifically, a rated voltage of the supply side DC bus 1001 is $U_{11}$, a rated current is $I_{11}$, $I_{11}$ is greater than or equal to a rated current of a superior DC distribution network feeder or a DC side feeder of an AC/DC module of the charging station, a rated voltage of the mutual aid total DC bus 1002 is $U_{12}$ a rated current is $I_{12}$, and $I_{12}$ satisfies: $I_{12} \geq I_{11} \times U_{11}/U_{12}$.

A rated voltage of each input DC bus (2161-2K61 in FIG. 1) is $U_{11}$, a rated current is $I_{21}$, and $I_{21}=I_{11}/K$; a rated voltage of each mutual aid sub-DC bus (2162-2K62 in FIG. 1) is $U_{12}$, and a rated current is $I_{22}$; a rated voltage of each output DC bus (2163-2K63 in FIG. 1) is $U_{12}$, and a rated current is $I_{23}$; a rated voltage of an input side of each isolation DC/DC module (2111-211N, 2211-221N, . . . 2K11-2K1N in FIG. 1) is $U_{11}$, a rated current of the input side is $I_{31}$, and $I_{31}=I_{21}/N$;

a rated voltage of an output side of each isolation DC/DC module (2111-211N, 2211-221N, ... 2K11-2K1N in FIG. 1) is $U_{12}$, a rated current of the output side is $I_{32}=I_{21}\times U_{11}/(U_{12}\times N)$, and $I_{23}\geq I_{32}\times N+I_{22}$; a rated voltage of each output switch (2121-212N, 2221-222N ... 2K21-2K2N in FIG. 1) and mutual aid switch (2131-213N, 2231-223N ... 2K31-2K3N in FIG. 1) is $U_{12}$, and a rated current is greater than or equal to $I_{32}$; and a rated voltage of an input side of the non-isolation DC/DC module (2101-2K01 in FIG. 1) is $U_{12}$, a rated current of the input side is $I_{23}$, a voltage of an output side is $U_{42v}$ and an output current is $I_{42v}$. The working range of $U_{42v}$ and $I_{42v}$ should cover the charging demand. A rated value $U_{42}$ of $U_{42v}$ shall meet the requirements for a voltage sequence in the national standard, and a rated value $I_{42}$ of $I_{42v}$ shall meet the requirements for a rated charging current sequence in the national standard of DC charging piles. Generally, $U_{42}\times I_{42}\geq U_{12}\times I_{22}\times r$, where r is a coincidence factor in the design reference of the charging station, and the rated working voltage and working current of each output terminal (2151-2K51 in FIG. 1) shall meet the requirements in the national standard.

The invention also discloses an operation control method of an integrated DC charging station.

During operation, all output switches and mutual aid switches are off, and isolation DC/DC modules and non-isolation DC/DC modules are not working.

When a current charging pile unit is connected to an electric vehicle, the following steps are performed:

step 1, assuming that the required power of the electric vehicle is $P_v$, determining whether $P_v$ is greater than $I_{32}\times N$;

if $P_v$ is greater than $I_{32}\times N$, determining whether the number of isolation DC/DC modules in an idle state in other charging pile units satisfies:

$(P_v/U_{12}-I_{32}\times N)\leq d\times I_{32}$; if so, proceeding to step 2; if not, that is, $(P_v/U_{12}-I_{32}\times N)>\times I_{32}$, proceeding to step 3;

if $P_v$ is less than or equal to $I_{32}\times N$, starting b isolation DC/DC modules in the current charging pile unit, closing an output switch connected to the b started isolation DC/DC modules, and starting the non-isolation DC/DC module of the current charging pile unit so that the current charging pile unit outputs the required power of the electric vehicle, where b satisfies: $(b-1)\times I_{32}<P_v/U_{12}\leq b\times I_{32}$;

step 2, starting N isolation DC/DC modules in the current charging pile unit, closing an output switch connected to the N started isolation DC/DC modules, and starting the non-isolation DC/DC module of the current charging pile unit; meanwhile, starting c isolation DC/DC modules in an idle state in other charging pile units, c satisfies: $(c-1)\times I_{32}<(P_v/U_{12}-I_{32}\times N)\leq c\times I_{32}$, and closing a mutual aid switch connected to, the c started isolation DC/DC modules so that the current charging pile unit outputs the required power of the electric vehicle; and step 3, starting N isolation DC/DC modules in the current charging pile unit, closing an output switch connected to the isolation DC/DC modules, and starting the non-isolation DC/DC module of the current charging pile unit; meanwhile, starting d isolation DC/DC modules in an idle state in other charging pile units, and closing a mutual aid switch connected to the d isolation DC/DC modules so that the current charging pile unit outputs a power smaller than the required power of the electric vehicle.

The invention claimed is:

1. An electrical topology of an integrated DC charging station, comprising: a supply side DC bus (1001) connected to a DC source, K discrete charging pile units and a mutual aid total DC bus (1002);

wherein each said charging pile unit comprises an input DC bus (2K61), a mutual aid sub-DC bus (2K62), an output DC bus (2K63), N isolation branches, a non-isolation DC/DC module (2K01) and an output terminal (2K51), the input DC bus (2K61) of each said charging pile unit is connected to the supply side DC bus (1001), and the mutual aid sub-DC bus (2K62) of each said charging pile unit is connected to the mutual aid total DC bus (1002);

the isolation branches have a same configuration, comprising an isolation DC/DC module (2K1N), an output switch (2K2N) and a mutual aid switch (2K3N);

in each said isolation branch, an input side of the isolation DC/DC module (2K1N) is connected to the input DC bus (2K61), an output side is connected to the output DC bus (2K63) through the output switch (2K2N) to form an output branch, and the output side is connected to the mutual aid sub-DC bus (2K62) through the mutual aid switch (2K3N) to form a mutual aid branch; the mutual aid sub-DC bus (2K62) is connected to the output DC bus (2K63) through a switch (2K41), and the output DC bus (2K63) is connected to the output terminal (2K51) through the non-isolation DC/DC module (2K01); and when all the output branches of one said charging pile unit connected to an electric vehicle are started and output power cannot meet required power of the electric vehicle, the mutual aid branches of other charging pile units are started to meet the required power of the electric vehicle.

2. The electrical topology of an integrated DC charging station according to claim 1, wherein, the DC source is a DC distribution network feeder or a DC side feeder of an AC/DC module of the charging station.

3. The electrical topology of an integrated DC charging station according to claim 1, wherein, a rated current $I_{11}$ of the supply side DC bus (1001) is greater than or equal to a rated current of the DC source.

4. The electrical topology of an integrated DC charging station according to claim 3, wherein, a rated current $I_{12}$ of the mutual aid total DC bus (1002) satisfies:

$I_{12}\geq I_{11}\times U_{11}/U_{12}$, where $U_{11}$ is a rated voltage of the supply side DC bus (1001) and $U_{12}$ is a rated voltage of the mutual aid total DC bus (1002).

5. The electrical topology of an integrated DC charging station according to claim 1, wherein, a rated current of each said output switch and mutual aid switch is greater than or equal to a rated current $I_{32}$ of an output side of the isolation DC/DC module.

6. The electrical topology of an integrated DC charging station according to claim 5, wherein, the rated current $I_{32}$ of the output side of each said isolation DC/DC module satisfies: $I_{32}=I_{21}\times U_{11}/(U_{12}\times N)$, where $I_{21}$ is a rated current of the input DC bus, $I_{21}=I_{11}/K$, $U_{11}$ is a rated voltage of the supply side DC bus (1001), and $I_{11}$ is a rated current of the supply side DC bus (1001); and the rated current $I_{23}$ of each said output DC bus satisfies:

$I_{23}\geq I_{32}\times N+I_{22}$; where $I_{22}$ is a rated current of the mutual aid sub-DC bus.

7. The electrical topology of an integrated DC charging station according to claim 1, wherein, a rated voltage $U_{42}$ and a rated current $I_{42}$ of an output side of each said non-isolation DC/DC module satisfy: $U_{42}\times I_{42}\geq U_{12}\times I_{22}\times r$, where $U_{12}$ is a rated voltage of the mutual aid total DC bus (1002), $I_{22}$ is a rated current of the mutual aid sub-DC bus, and r is a coincidence factor.

8. An operation control method of the electrical topology of an integrated DC charging station according to claim 1, comprising the following steps:

when the integrated DC charging station runs normally, all output switches and mutual aid switches being off, and all isolation DC/DC modules and non-isolation DC/DC modules not working;

when a current charging pile unit is connected to an electric vehicle, the following steps being performed:

step 1, assuming that the required power of the electric vehicle is $P_v$, determining whether $P_v$ is greater than $I_{32} \times N$;

if $P_v$ is greater than $I_{32} \times N$, determining whether the number d of isolation DC/DC modules in an idle state in other charging pile units satisfies: $(P_v/U_{12} - I_{32} \times N) \leq d \times I_{32}$;

if so, proceeding to step 2, if not, that is, $(P_v/U_{12} - I_{32} \times N) > d \times I_{32}$, proceeding to step 3;

if $P_v$ is less than or equal to $I_{32} \times N$, starting b isolation DC/DC modules in the current charging pile unit, closing an output switch connected to the b started isolation DC/DC modules, and starting the non-isolation DC/DC module of the current charging pile unit so that the current charging pile unit outputs the required power of the electric vehicle, where b satisfies: $(b-1) \times I_{32} < P_v/U_{12} \leq b \times I_{32}$;

step 2, starting N isolation DC/DC modules in the current charging pile unit, closing an output switch connected to the N started isolation DC/DC modules, and starting the non-isolation DC/DC module of the current charging pile unit; meanwhile, starting c isolation DC/DC modules in an idle state in other charging pile units, c satisfies:

$(c-1) \times I_{32} < (P_v/U_{12} - I_{32} \times N) \leq c \times I_{32}$, and closing a mutual aid switch connected to the c started isolation DC/DC modules so that the current charging pile unit outputs the required power of the electric vehicle; and step 3, starting N isolation DC/DC modules in the current charging pile unit, closing an output switch connected to the isolation DC/DC modules, and starting the non-isolation DC/DC module of the current charging pile unit; meanwhile, starting d isolation DC/DC modules in an idle state in other charging pile units, and closing a mutual aid switch connected to the d isolation DC/DC modules so that the current charging pile unit outputs a power smaller than the required power of the electric vehicle.

* * * * *